US008301018B2

(12) United States Patent
Shibata

(10) Patent No.: US 8,301,018 B2
(45) Date of Patent: Oct. 30, 2012

(54) AUDIO/VIDEO SYNCHRONOUS PLAYBACK DEVICE

(75) Inventor: Hideaki Shibata, Osaka (JP)

(73) Assignee: Panasonic Corporation, Osaka (JP)

( * ) Notice: Subject to any disclaimer, the term of this patent is extended or adjusted under 35 U.S.C. 154(b) by 1141 days.

(21) Appl. No.: 12/166,830

(22) Filed: Jul. 2, 2008

(65) Prior Publication Data

US 2009/0110370 A1 Apr. 30, 2009

(30) Foreign Application Priority Data

Oct. 24, 2007 (JP) ................................. 2007-276136

(51) Int. Cl.
*H04N 5/93* (2006.01)
(52) U.S. Cl. ........ 386/353; 386/337; 386/338; 386/339; 386/340; 386/341; 348/512; 348/515
(58) Field of Classification Search .................. 386/353, 386/337–341; 348/512, 515
See application file for complete search history.

(56) References Cited

U.S. PATENT DOCUMENTS

| 3,941,930 | A | * | 3/1976 | Mohri et al. | 348/525 |
|---|---|---|---|---|---|
| 5,594,660 | A | * | 1/1997 | Sung et al. | 715/203 |
| 5,598,352 | A | * | 1/1997 | Rosenau et al. | 715/203 |
| 5,636,073 | A | | 6/1997 | Yamamoto et al. | |
| 5,757,670 | A | * | 5/1998 | Ti et al. | 375/240.01 |
| 5,793,437 | A | * | 8/1998 | Inamori | 348/559 |
| 6,430,361 | B2 | | 8/2002 | Lee et al. | |
| 6,512,552 | B1 | * | 1/2003 | Subramanian | 348/564 |
| 6,525,783 | B1 | * | 2/2003 | Kim et al. | 348/714 |
| 6,583,821 | B1 | * | 6/2003 | Durand | 348/515 |
| 7,054,544 | B1 | * | 5/2006 | Tanaka | 386/239 |
| 7,333,149 | B2 | * | 2/2008 | Choi | 348/441 |
| 7,511,760 | B2 | * | 3/2009 | Otomo | 348/443 |
| 7,542,659 | B2 | * | 6/2009 | Kozuka et al. | 386/241 |
| 2003/0206727 | A1 | * | 11/2003 | Sawabe et al. | 386/96 |
| 2006/0001777 | A1 | * | 1/2006 | Araki | 348/706 |
| 2006/0280273 | A1 | * | 12/2006 | Mueller-Weinfurtner | 375/368 |
| 2007/0019931 | A1 | * | 1/2007 | Sirbu | 386/96 |
| 2009/0129752 | A1 | * | 5/2009 | Yamada et al. | 386/102 |

FOREIGN PATENT DOCUMENTS

JP 2000-032397 1/2000

OTHER PUBLICATIONS

Espacenet search result, Espacenet Result list, Jun. 2011.*
Chi-Chen et al, Adaptive Transmission Control for Error-Resilient Multimedia Synchronization, May 2004.*
Espacenet search, Espacenet Result List, Jan. 2012.*

* cited by examiner

*Primary Examiner* — Taghi Arani
*Assistant Examiner* — Shan Elahi
(74) *Attorney, Agent, or Firm* — McDermott Will & Emery LLP

(57) ABSTRACT

An audio/video synchronous playback device includes a first synchronization section for repeating or skipping a first video data sequence in units of a video frame interval thereof to synchronize the first video data sequence with an audio data sequence, and a second synchronization section for repeating or skipping a second video data sequence in units of a video frame or video field interval thereof to synchronize the second video data sequence with the audio data sequence. A first video data sequence output and a second video data sequence output having different frame frequencies are separately synchronized with one channel of audio data sequence output with their respective precisions.

9 Claims, 3 Drawing Sheets

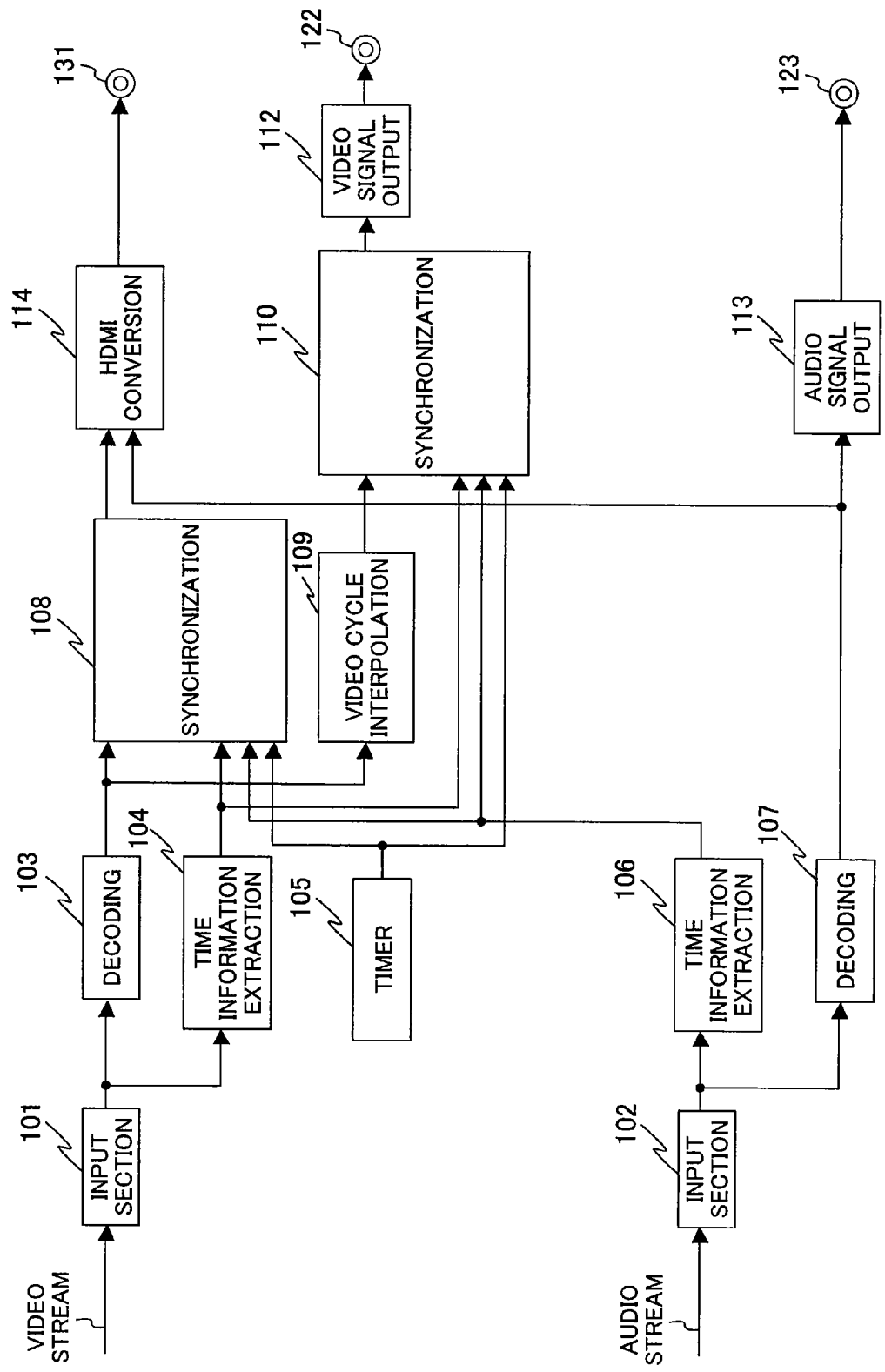

AUDIO/VIDEO SYNCHRONOUS PLAYBACK DEVICE

BACKGROUND OF THE INVENTION

1. Field of the Invention

The present invention relates to an audio/video synchronous playback device for decoding digital stream data for the purpose of listening to and watching the decoded audio and video, which is suitable when one channel of audio data and N channels (N is an integer of two or more) of video data having different frame frequencies are simultaneously output.

2. Description of the Related Art

In a conventional audio/video synchronous playback device, audio data and video data are synchronized with each other as follows. Video time information extracted by a time information extraction section is compared with reference time information generated by a timer. A synchronization section performs time-axis compression/expansion with respect to a sequence of video data so that the video data sequence is synchronized with reference time. On the other hand, audio time information extracted by the time information extraction section is compared with the reference time information generated by the timer. The synchronization section performs time-axis compression/expansion with respect to a sequence of audio data so that the audio data sequence is synchronized with the reference time. As a result, audio data and video data are synchronized with each other (see Japanese Unexamined Patent Application Publication No. 2000-32397).

SUMMARY OF THE INVENTION

In the above-described conventional configuration, when a plurality of pieces of video data having different frame frequencies are simultaneously output based on video data obtained by decoding, synchronization can be performed only in units of a video frame interval of a single frame frequency.

The present invention is provided to solve the above-described conventional problem. An object of the present invention is to provide an audio/video synchronous playback device capable of performing synchronization with respect to each piece of video data having its own frame frequency when a plurality of pieces of video data having different frame frequencies are simultaneously output.

To solve the above-described conventional problem, an audio/video synchronous playback device according to an aspect of the present invention includes a first decoding section for decoding a video stream to output a first video data sequence including a plurality of video frames having a first frame interval, a first time information extraction section for extracting video time information from the video stream, a video cycle interpolation section for performing an interpolation process with respect to the first video data sequence output from the first decoding section to output a second video data sequence including a plurality of video frames or video fields having a second frame or field interval, a second decoding section for decoding an audio stream to output an audio data sequence including a plurality of audio blocks, a second time information extraction section for extracting audio time information from the audio stream, a timer section for generating reference time information, a first synchronization section for comparing the video time information with the audio time information and the reference time information, and depending on a result of the comparison, repeating or skipping the first video data sequence in units of the video frame interval, thereby synchronizing the first video data sequence with the audio data sequence, and a second synchronization section for comparing the video time information with the audio time information and the reference time information, and depending on a result of the comparison, repeating or skipping the second video data sequence in units of the video frame or video field interval, thereby synchronizing the second video data sequence with the audio data sequence.

With this configuration, a first video data sequence output and a second video data sequence output having different frame frequencies can be separately synchronized with one channel of audio data sequence output with their respective precisions.

According to the audio/video synchronous playback device of the present invention, optimal synchronization can be achieved, depending on the frame frequencies of pieces of video data that are simultaneously output. Thereby, video outputs having any frame frequencies that are simultaneously output can be synchronized with an audio output, so that the audio output and the video outputs can be listened to and watched without feeling of unnaturalness.

BRIEF DESCRIPTION OF THE DRAWINGS

FIG. 3 is a block diagram showing an audio/video synchronous playback device according to Embodiment 2 of the present invention.

DETAILED DESCRIPTION OF THE PREFERRED EMBODIMENTS

Hereinafter, embodiments of the present invention will be described with reference to the accompanying drawings.

Figure 1:
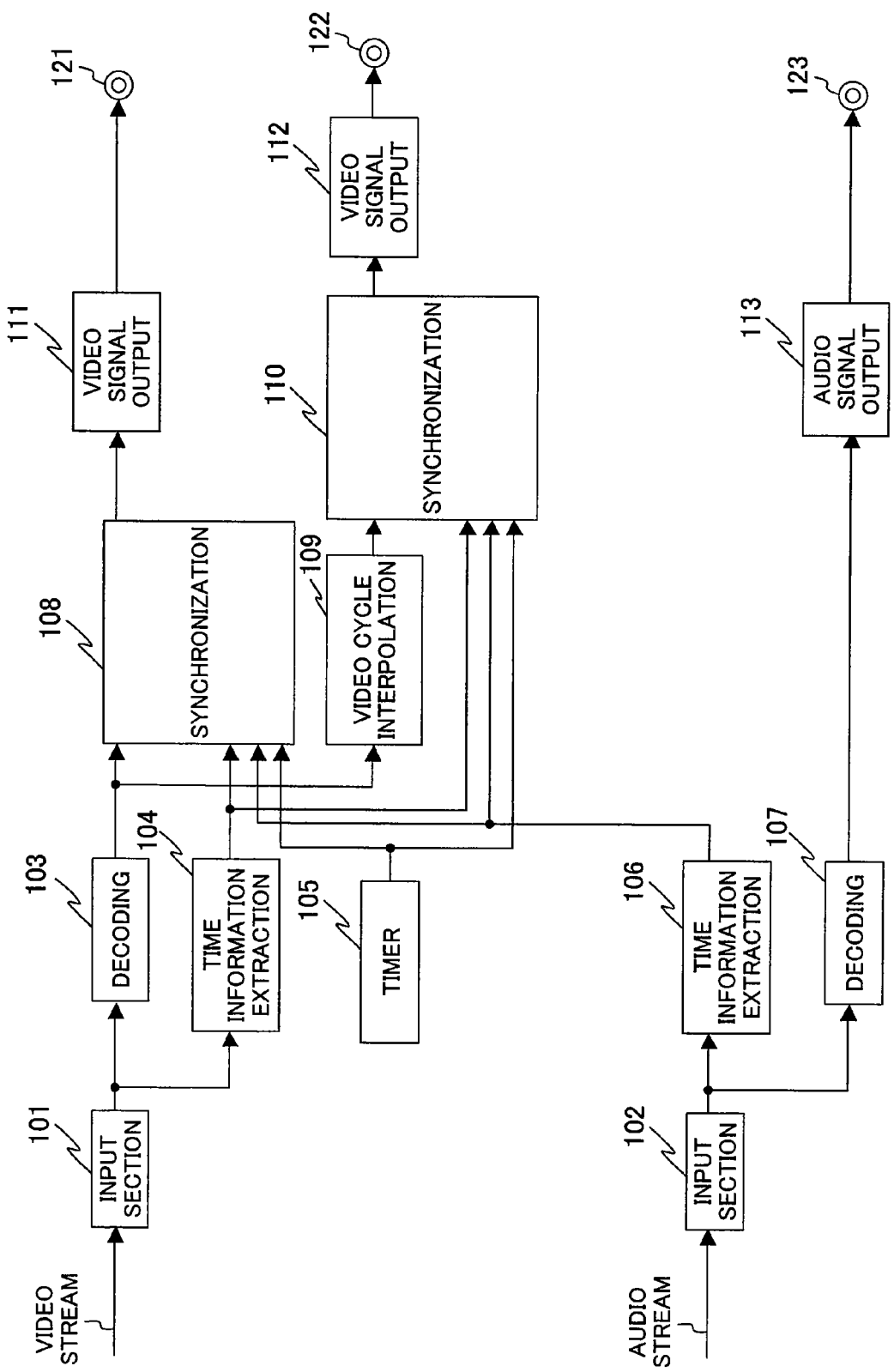
FIG. 1 is a block diagram showing an audio/video synchronous playback device according to Embodiment 1 of the present invention.

FIG. 1 shows an audio/video synchronous playback device according to Embodiment 1 of the present invention. The audio/video synchronous playback device of Embodiment 1 comprises a first input section 101 for performing an input process with respect to a video stream, a second input section 102 for performing an input process with respect to an audio stream, a first decoding section 103 for decoding and converting a video stream into video data, a first time information extraction section 104 for extracting video time information from a video stream, a timer section 105 for generating reference time information, a second time information extraction section 106 for extracting audio time information from an audio stream, a second decoding section 107 for decoding and converting an audio stream into audio data, a first synchronization section 108 for performing time-axis compression/expansion with respect to video data output from the first decoding section 103 according to the video time information and the audio time information output from the first and second time information extraction sections 104 and 106 for the purpose of synchronization, a video cycle interpolation section 109 for performing an interpolation process so as to convert the video data output from the first decoding section 103 into a frame frequency, a second synchronization section 110 for performing time-axis compression/expansion with respect to cycle-interpolated video data output from the video cycle interpolation section 109 according to the video time information and the audio time information output from the first and second time information extraction sections 104 and 106 for the purpose of synchronization, a first video signal output section 111 for converting a synchronized digital video signal output from the first synchronization section 108 into an analog signal and outputting the analog signal, a second video signal output section 112 for converting a synchronized digital video signal output from the second synchronization section 110 into an analog signal and outputting the analog signal, an audio signal output section 113 for converting a digital audio signal output from the second decoding section 107 into an analog signal and outputting the analog signal, a first video output terminal 121 for outputting the analog signal of the first video signal output section 111, a second video output terminal 122 for outputting the analog signal of the second video signal output section 112, and an audio output terminal 123 for outputting the analog signal of the audio signal output section 113.

Hereinafter, an operation of the thus-configured audio/video synchronous playback device will be described. Initially, digitally compressed video and audio streams stored in a packaged medium, such as a BD-ROM disc or the like, are input to the first and second input sections 101 and 102, respectively. The first and second input sections 101 and 102 perform an input process with respect to the respective streams. In the input process, for example, a structure of the stream is analyzed so that the stream is separated into truly compressed data and added data. The first decoding section 103 decodes and converts a video stream output from the first input section 101 into video data. On the other hand, the first time information extraction section 104 extracts time information about the video data. Similarly, the second decoding section 107 decodes and converts an audio stream output from the second input section 102 into audio data. On the other hand, the second time information extraction section 106 extracts time information about the audio data, and outputs the extracted audio time information to the first and second synchronization sections 108 and 110. The audio data output from the second decoding section 107 is output through the audio signal output section 113.

The video data output from the first decoding section 103 is input to the first synchronization section 108 and the video cycle interpolation section 109. The first synchronization section 108 compares the video time information input from the first time information extraction section 104 with the audio time information input from the second time information extraction section 106 and the reference time information input from the timer section 105. When a difference between the video time information and the audio time information is larger than a frame cycle of the video data output from the first decoding section 103, the first synchronization section 108 repeats or skips the video data input from the first decoding section 103 in units of a frame so that the video data is synchronized with the audio time information (synchronization). The resultant video data is output through the first video signal output section 111.

The video cycle interpolation section 109 performs an interpolation process with respect to a plurality of frames of video data output from the first decoding section 103 to generate video data including video frames or video fields having a cycle shorter than the original frame cycle, and outputs the resultant video data to the second synchronization section 110.

Figure 2:
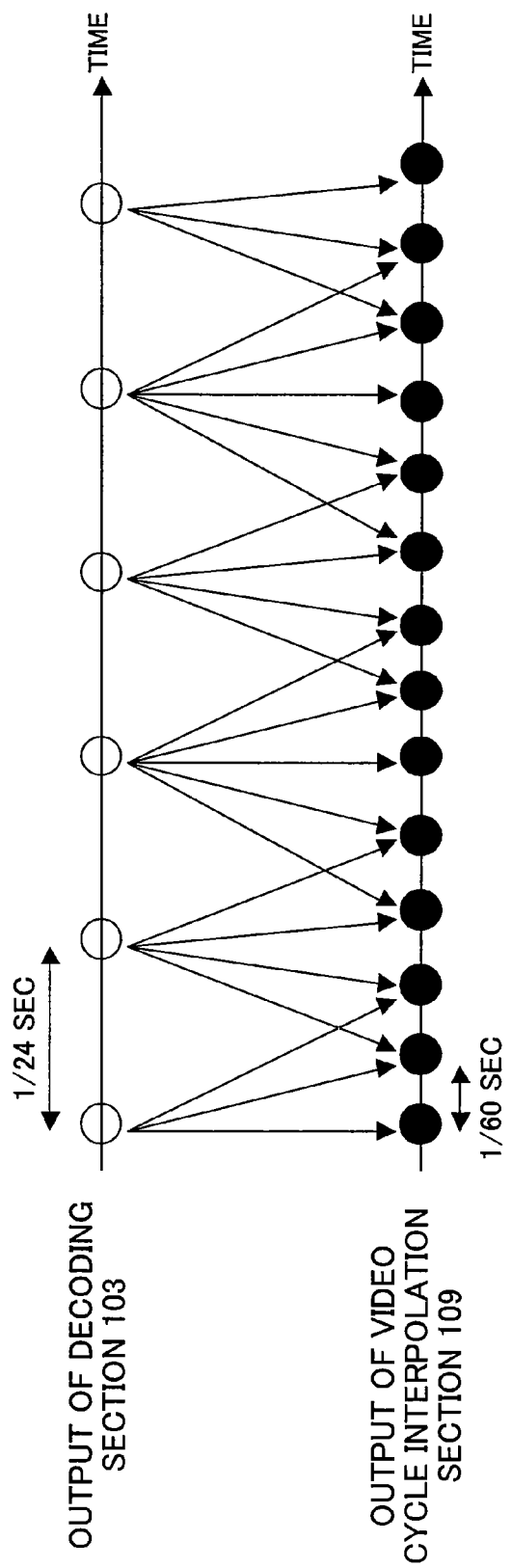
FIG. 2 is a diagram for describing an operation of a video cycle interpolation section of FIG. 1.

The process of the video cycle interpolation section 109 will be described with reference to FIG. 2. In FIG. 2, open circles represent video frames output from the first decoding section 103, and closed circles represent video fields output from the video cycle interpolation section 109. A video output from the first decoding section 103 is, for example, a video output having a frame frequency of 24 Hz. On the other hand, a video output from the video cycle interpolation section 109 is, for example, a video output having a field frequency of 59.94 Hz. In FIG. 2, it is assumed that video data corresponding to two frames (two open circles) is used to generate video data corresponding to one field (one closed circle), i.e., the interpolation process is performed using two frames of data of 24 Hz to generate one field of video data of 59.94 Hz. As a result, the output of the video cycle interpolation section 109 is a video data sequence having a lower frame frequency.

The second synchronization section 110 compares the video time information input from the first information extraction section 104 with the audio time information input from the second time information extraction section 106 and the reference time information input from the timer section 105. If a difference between the video time information and the audio time information is larger than the field cycle of the video data output from the video cycle interpolation section 109, the second synchronization section 110 repeats or skips the video data input from the video cycle interpolation section 109 in units of a field so as to synchronize the video data with the audio time information (synchronization). The resultant video data is output through the second video signal output section 112.

With the above-described configuration, a video signal output from the first video signal output section 111 can be synchronized with an audio signal in units of 24 Hz, while a video signal output from the second video signal output section 112 can be synchronized with an audio signal in units of 59.94 Hz. Thereby, an output video signal having a low frame frequency can be synchronized with high precision, so that audio and videos can be output with less occurrence of feeling of discomfort, such as lip sync error or the like.

Although it has been described in Embodiment 1 of the present invention that two channels of video outputs having different frequencies of 24 Hz and 59.94 Hz are simultaneously output, two or more channels of video outputs having any different frequencies may be used.

FIG. 3 shows an audio/video synchronous playback device according to Embodiment 2 of the present invention. The audio/video synchronous playback device of Embodiment 2 is different from the audio/video synchronous playback device of Embodiment 1 (see FIG. 1) in that the audio/video synchronous playback device of Embodiment 2 includes an HDMI conversion section 114 for converting synchronized video data output from the first synchronization section 108 and audio data output from the second decoding section 107 into an HDMI (High-Definition Multimedia Interface) signal, and an HDMI output terminal 131 for outputting the HDMI signal.

An operation relating to conversion of audio data and video data of the audio/video synchronous playback device of FIG. 3 will be described, and the other operations are the same as those described in Embodiment 1 and will not be described.

With the configuration of FIG. 3, the HDMI conversion section 114 converts video data having a frame frequency of 24 Hz that has been synchronized by the first synchronization section 108 and audio data that has been obtained by the second decoding section 107 into an HDMI signal and outputs the HDMI signal to a TV monitor or the like. On the other hand, the video signal output section 112 converts video data of 59.94 Hz that has been synchronized by the second synchronization section 110 from a digital signal into an analog signal, and outputs the analog signal to a TV monitor or the like. The audio signal output section 113 converts audio data output from the second decoding section 107 from a digital signal into an analog signal, and outputs the analog signal to a TV monitor or the like.

With the above-described configuration, audio data and video data output from the HDMI conversion section 114 can be synchronized with each other in units of 24 Hz, while a video signal output from the video signal output section 112 can be synchronized with an audio signal in units of 59.94 Hz. Thereby, a video data output having a low frame frequency can be synchronized with high precision, so that audio and videos can be output with less occurrence of feeling of discomfort, such as lip sync error or the like.

Note that a video output having the same frame frequency as that of NTSC (National Television Standards Committee) signals may be obtained through the video output terminal 122. Also, a video output having the same frame frequency as that of PAL (Phase Alternation by Line) signals may be obtained through the video output terminal 122

As described above, the audio/video synchronous playback device of the present invention is applicable to and useful for a DVD player, a BD player or the like in which, for example, 24-Hz video data is output through an HDMI output terminal while video data having a different video cycle of 59.94 Hz is output through an S-video output terminal, a component output terminal, or a composite video output terminal.

What is claimed is:

1. An audio/video synchronous playback device having N channels (N is an integer of two or more) of video outputs having different frame frequencies and one channel of audio output, wherein
at least two of the N channels of video outputs are simultaneously performed and are separately synchronized with the one channel of audio output.

2. The audio/video synchronous playback device of claim 1, wherein the N channels of video outputs include a video output having a frame frequency of 24 Hz and a video output having the same frame frequency as that of NTSC signals.

3. The audio/video synchronous playback device of claim 2, wherein the video output having a frame frequency of 24 Hz is output through an HDMI terminal.

4. The audio/video synchronous playback device of claim 1, wherein the N channels of video outputs include a video output having a frame frequency of 24 Hz and a video output having the same frame frequency as that of PAL signals.

5. The audio/video synchronous playback device of claim 4, wherein the video output having a frame frequency of 24 Hz is output through an HDMI terminal.

6. An audio/video synchronous playback device comprising:
a first decoding section for decoding a video stream to output a first video data sequence including a plurality of video frames having a first frame interval;
a first time information extraction section for extracting video time information from the video stream;
a video cycle interpolation section for performing an interpolation process with respect to the first video data sequence output from the first decoding section to output a second video data sequence including a plurality of video frames or video fields having a second frame or field interval which are different from those of the first video data sequence;
a second decoding section for decoding an audio stream to output an audio data sequence including a plurality of audio blocks;
a second time information extraction section for extracting audio time information from the audio stream;
a timer section for generating reference time information;
a first synchronization section for comparing the video time information with the audio time information and the reference time information, and depending on a result of the comparison, repeating or skipping the first video data sequence in units of the video frame interval, thereby synchronizing the first video data sequence with the audio data sequence; and
a second synchronization section for comparing the video time information with the audio time information and the reference time information, and depending on a result of the comparison, repeating or skipping the second video data sequence in units of the video frame or video field interval, thereby synchronizing the second video data sequence with the audio data sequence,
wherein synchronization of the first video data sequence with the audio data sequence, and the synchronization of the second video data sequence with the audio data sequence are simultaneously performed.

7. The audio/video synchronous playback device of claim 6, further comprising:
an analog audio output terminal for converting the audio data sequence into an analog signal and outputting the analog signal;
a first analog video output terminal for converting the first video data sequence output from the first synchronization section into an analog signal and outputting the analog signal; and
a second analog video output terminal for converting the second video data sequence output from the second synchronization section into an analog signal and outputting the analog signal.

8. The audio/video synchronous playback device of claim 6, further comprising:
an analog audio output terminal for converting the audio data sequence into an analog signal and outputting the analog signal;
an HDMI output terminal for converting the first video data sequence and the audio data sequence output from the first synchronization section into an HDMI signal and outputting the HDMI signal; and
an analog video output terminal for converting the second video data sequence output from the second synchronization section into an analog signal and outputting the analog signal.

9. The audio/video synchronous playback device of claim 6, wherein the frame interval of the first video data sequence corresponds to a frame frequency of 24 Hz.

* * * * *